(12) United States Patent
Hoshi

(10) Patent No.: US 9,428,084 B2
(45) Date of Patent: Aug. 30, 2016

(54) SEAT FRAME FOR VEHICLE SEAT

(75) Inventor: Masayuki Hoshi, Tochigi (JP)

(73) Assignee: TS TECH CO., LTD., Asaka-Shi (JP)

( * ) Notice: Subject to any disclaimer, the term of this patent is extended or adjusted under 35 U.S.C. 154(b) by 0 days.

(21) Appl. No.: 14/424,312

(22) PCT Filed: Sep. 3, 2012

(86) PCT No.: PCT/JP2012/072387
§ 371 (c)(1),
(2), (4) Date: Feb. 26, 2015

(87) PCT Pub. No.: WO2014/033962
PCT Pub. Date: Mar. 6, 2014

(65) Prior Publication Data
US 2015/0239369 A1    Aug. 27, 2015

(51) Int. Cl.
*B60N 2/68*     (2006.01)
*B60N 2/22*     (2006.01)
*B60N 2/16*     (2006.01)
*B60N 2/225*    (2006.01)
*B60N 2/02*     (2006.01)

(52) U.S. Cl.
CPC ............ *B60N 2/165* (2013.01); *B60N 2/1615* (2013.01); *B60N 2/22* (2013.01); *B60N 2/225* (2013.01); *B60N 2/68* (2013.01); *B60N 2/682* (2013.01); *B60N 2002/024* (2013.01)

(58) Field of Classification Search
CPC ................... B60N 2/0232; B60N 2002/0236; B60N 2002/024; B60N 2/682; B60N 2/68; B60N 2/165; B60N 2/615; B60N 2/22; B60N 2/225; B60N 2/1615

USPC ......................................... 297/362.11, 452.18
See application file for complete search history.

(56) References Cited

U.S. PATENT DOCUMENTS

| | | | | |
|---|---|---|---|---|
| 5,769,499 A | * | 6/1998 | Dudash et al. | 297/452.18 |
| 7,976,103 B2 | * | 7/2011 | Gamache et al. | 297/362.11 |
| 8,052,215 B2 | * | 11/2011 | Ito | 297/362.11 |
| 2007/0200408 A1 | * | 8/2007 | Ohta et al. | 297/362.11 |
| 2011/0012413 A1 | * | 1/2011 | Du et al. | 297/362 |

FOREIGN PATENT DOCUMENTS

| | | |
|---|---|---|
| DE | 102012019810 A1 * | 4/2014 |
| JP | 59-68449 U | 5/1984 |
| JP | 04-124525 U | 11/1992 |
| JP | 2006-306188 A | 11/2006 |
| JP | 2012-131464 A | 7/2012 |

* cited by examiner

*Primary Examiner* — Milton Nelson, Jr.
(74) *Attorney, Agent, or Firm* — Drinker Biddle & Reath LLP

(57) ABSTRACT

A bracket for attaching an actuator is easily bonded to a side frame while avoiding interference with a shaft for driving a reclining mechanism. In a seat side frame which is provided at each of both ends of a seat back frame in the width direction, a reclining mechanism, and an actuator, the reclining mechanism is attached to a side wall of the side frame, and the actuator is fixed to an attachment bracket bonded to an inner surface of a portion to which the reclining mechanism is attached in the side wall in the width direction. An upper portion which is disposed above the attachment portion of the reclining mechanism and a lower portion which is disposed below the attachment portion thereof are connected to each other at the rear ends thereof and are separated from each other at the front ends thereof.

9 Claims, 14 Drawing Sheets

WIDTH DIRECTION

SEAT FRAME FOR VEHICLE SEAT

CROSS REFERENCE TO RELATED APPLICATIONS

This application is a National Stage Entry application of PCT Application No. PCT/JP2012/072387, filed Sep. 3, 2012.

BACKGROUND

Disclosed herein is a seat frame for a vehicle seat, and particularly, a seat frame for a vehicle seat in which a reclining mechanism and an actuator for driving the reclining mechanism are attached to each of side frames disposed at both right and left ends of a seat back frame.

In a reclining mechanism which rotates a seat back with respect to a seat cushion in a seat frame for a vehicle seat, there is known an electric reclining mechanism which is operated by a driving force applied from an actuator as another member (for example, see Japanese Patent Document No. 2006-306188 A ("the '188 Document").

The reclining mechanism disclosed in the '188 Document includes a shaft which penetrates a reclining mechanism body, and the shaft is inserted in a through-hole formed in a side frame. An actuator which is disposed at an inner side of each of the right and left side frames is attached to a portion of the shaft which protrudes from the through-hole. Here, an output shaft of the actuator is engaged with the shaft. Thus, when the actuator is driven, the output shaft rotates along with the shaft, and hence the driving force generated from the actuator is transmitted to the reclining mechanism.

In the reclining mechanism disclosed in the '188 Document, the actuator is fixed to a predetermined portion of the seat frame by a bolt in order to regulate the rotation of the actuator when the actuator is driven.

As illustrated in the '188 Document, the reclining mechanism is generally attached to each of the side frames disposed at both right and left ends of the seat back frame, in particular, to lower ends connected to a seat cushion frame. Further, in the '188 Document, a bolt hole is formed in the vicinity of the arrangement space of the actuator in the side frame in order to fasten the bolt for stopping the rotation of the actuator to the side frame. In addition, in the '188 Document, a reinforcement bracket is bonded to a portion of the side frame, which is provided with the bolt hole.

In the case where the reinforcement bracket is bonded to the side frame, it is desirable that the reinforcement bracket can be easily attached to the side frame. However, in the case of bonding the reinforcement bracket to the side frame, there is a concern that the shaft rotating to drive the reclining mechanism may interfere with the reinforcement bracket. Thus, the reinforcement bracket is required to have a shape to be easily bonded to the side frame while avoiding the interference with the shaft.

Further, it is desirable that the number of components of the vehicle seat is small as much as possible. For this, it is beneficial to decrease the number of components in the structure where the reinforcement bracket is provided.

Further, in the case of bonding the reinforcement bracket to the side frame by welding, the welding area needs to be set so that the positional relation between the bolt for fixing the actuator and the shaft is stable without varying. It is desirable to set the welding area between the reinforcement bracket and the side frame so that the welding operation is easily performed.

Further, there is a need to ensure the rigidity of the reinforcement bracket itself in order to stabilize the bonded state between the reinforcement bracket and the side frame. For that reason, it is beneficial to secure the rigidity of the reinforcement bracket while considering the interference of the reinforcement bracket with respect to the actuator during the attachment of the actuator.

Moreover, in the case where a rotation shaft of an armrest is supported by the side frame in the vehicle seat equipped with the armrest, there is a need to provide the reinforcement bracket in consideration of the load generated in the side frame by the rotation of the armrest.

SUMMARY

Therefore, various embodiments of the invention are made in view of the above-described problems, and an object thereof is to provide a seat frame for a vehicle seat which allows a bracket for attaching an actuator to be easily attached to a side frame while avoiding an interference with a shaft for driving a reclining mechanism.

Further, another object is to provide a seat frame for a vehicle seat which can decrease the number of components while providing a bracket for attaching an actuator.

Further, another object is to provide a seat frame for a vehicle seat in which a welding area is set to stabilize a positional relation between a bolt for fixing an actuator and a shaft for driving a reclining mechanism when a bracket for attaching an actuator is bonded to a side frame by welding. Particularly, another object is to provide a seat frame for a vehicle seat in which a welding area is appropriately set so that a welding operation is easily performed.

Further, another object is to provide a seat frame for a vehicle seat which can improve the rigidity of a bracket while it is taken into consideration that a bracket for attaching an actuator does not interfere with the actuator.

Furthermore, another object is to provide a seat frame for a vehicle seat, which includes a bracket being for attaching an actuator and having a shape devised in consideration of a load generated in a side frame by the rotation of an armrest in the vehicle seat including the armrest.

The above-described problems may be solved by a seat frame for a vehicle seat, including: a side frame which is disposed at each of both ends of a seat back frame of a seat back of the vehicle seat in the width direction of the vehicle seat; a reclining mechanism which includes a rotation shaft extending in the width direction and pivots the seat back with respect to a seat cushion of the vehicle seat by the rotation of the rotation shaft; and an actuator which is driven to rotate the rotation shaft, wherein the reclining mechanism is attached to a side wall while the rotation shaft penetrates the side wall of the side frame, wherein the actuator is fixed to an attachment bracket bonded to an inner surface of the side wall in the width direction while engaging with a portion of the rotation shaft penetrating the side wall of the side frame, wherein the attachment bracket includes an upper portion which is disposed above the attachment area of the reclining mechanism in the side wall and a lower portion which is disposed below the attachment area of the reclining mechanism in the side wall, and wherein one end of the upper portion and one end of the lower portion in the front to back direction of the vehicle seat are connected to each other, and the other end of the upper portion and the other end of the lower portion in the front to back direction are separated from each other.

According to the above-described configuration, since the shape of the attachment bracket of the actuator is formed as a shape that avoids the attachment area of the reclining mechanism in the side wall of the side frame, the attachment bracket may be bonded to the side frame while avoiding the interference with the rotation shaft for driving the reclining mechanism. Further, since one end of the attachment bracket in the front to back direction is opened, the attachment bracket may be easily bonded to the side frame while avoiding the interference with the rotation shaft.

Further, the seat frame for the vehicle seat may further include a connection frame which connects the lower ends of the side frames to each other, and the attachment bracket may be disposed at each of both ends of the connection frame and may be integrated with the connection frame.

According to the above-described configuration, the end of the connection frame serves as the attachment bracket. That is, the number of components may be decreased compared to the configuration in which the attachment bracket is provided as a separate member.

Further, in the seat frame for the vehicle seat, the upper portion may be provided with a bolt hole for fixing the actuator, and a portion, which is located between the bolt hole and the attachment area of the reclining mechanism in the side wall, in the upper portion may be welded to the side wall.

According to the above-described configuration, since the attachment bracket is welded to the side frame at the position between the bolt hole and the attachment area of the reclining mechanism, a welding area exists between the bolt hole and the rotation shaft for driving the reclining mechanism. Accordingly, since the positions of the bolt hole and the rotation shaft do not easily change, the positional relation between the bolt for fixing the actuator and the rotation shaft is stabilized.

Further, in the seat frame for the vehicle seat, an area in which the reclining mechanism is attached to the side wall may be formed as a circular area when viewed from the width direction, and the attachment bracket may be formed in a C-shape that follows the outer edge of the attachment portion of the reclining mechanism in the side wall when viewed from the width direction.

According to the above-described configuration, the attachment bracket may be effectively bonded to the side frame in response to the outer edge of the attachment portion of the reclining mechanism in the side wall of the side frame.

Further, in the seat frame for the vehicle seat, the upper portion and the lower portion may be respectively welded to the side wall, at least a portion of the welding area between the upper portion and the side wall may be located in front of the rotation shaft, and at least a portion of the welding area between the lower portion and the side wall may be located behind the rotation shaft.

According to the above-described configuration, each of the upper portion and the lower portion of the attachment bracket may be satisfactorily bonded to the side wall of the side frame. Further, since each welding area extends in the front to back direction of the vehicle seat, the rigidity with respect to the load exerted in the front to back direction may be ensured. Accordingly, it is possible to stably maintain a state where each of the upper portion and the lower portion of the attachment bracket is bonded to the side wall of the side frame.

Further, in the seat frame for the vehicle seat, the upper end of the attachment bracket may be provided with a bent portion which is bent inward in the width direction.

According to the above-described configuration, since the bent portion is formed in the attachment bracket, the rigidity of the attachment bracket is improved.

Moreover, in the seat frame for the vehicle seat in which the bent portion is formed in the attachment bracket, the upper portion may be provided with the bolt hole for fixing the actuator, and a portion, which is adjacent to the portion provided with the bolt hole in the attachment bracket, in the bent portion may have an inward extension amount in the width direction shorter than the portion which is not adjacent to the portion provided with the bolt hole.

A portion which is adjacent to the portion provided with the bolt hole in the bent portion faces a portion of the actuator, specifically, the vicinity of the attachment portion of the fixed bolt. Thus, when the extension amount of the portion which is adjacent to the portion provided with the bolt hole in the bent portion is short as in the above-described configuration, the bent portion may be formed while suppressing the interference with the actuator.

Further, in the seat frame for the vehicle seat, a portion, which is located above the attachment bracket, in the side wall may support a rotation shaft used when an armrest of the vehicle seat rotates with respect to the seat back, the upper portion may include an extension portion which extends upward toward the rotation shaft, and the extension portion may be provided in front of the rotation shaft.

When the armrest rotates in the case where the rotation shaft of the armrest is supported by the side wall of the side frame, a load is applied to a portion which is located in front of the rotation shaft in the side frame. In contrast, in the above-described configuration, the extension portion in which the upper portion of the attachment bracket extends upward toward the rotation shaft is provided at the front position of the rotation shaft. Accordingly, it is possible to improve the rigidity of the side frame with respect to the load generated when the armrest rotates.

Further, in the seat frame for the vehicle seat in which the extension portion is provided in the upper portion of the attachment bracket, the rear end of the side wall may be provided with a fragile portion which is deformed so that the side frame is inclined backward when a collision load is applied from the rear side, and the extension portion may be provided in front of the fragile portion.

According to the above-described configuration, since the extension portion is provided at the front position of the fragile portion in order to avoid the fragile portion, the fragile portion is satisfactorily deformed when a collision load is applied to the vehicle seat from the rear side.

According to the seat frame for the vehicle seat of an embodiment of the invention, the attachment bracket is easily bonded to the side frame while avoiding the interference with the rotation shaft for driving the reclining mechanism.

According to the seat frame for the vehicle seat of an embodiment of the invention, the number of components is small compared to the configuration in which the attachment bracket is provided as a separate member.

According to the seat frame for the vehicle seat of an embodiment of the invention, since the positions of the bolt hole and the rotation shaft may not easily change, the positional relation between the bolt for fixing the actuator and the rotation shaft is stabilized.

According to the seat frame for the vehicle seat of an embodiment of the invention, the attachment bracket is effectively bonded to the side frame in response to the outer edge of the attachment area of the reclining mechanism in the side wall of the side frame.

According to the seat frame for the vehicle seat of an embodiment of the invention, each of the upper portion and the lower portion of the attachment bracket is satisfactorily bonded to the side wall of the side frame. Further, it is possible to stably maintain a state where each of the upper portion and the lower portion of the attachment bracket is bonded to the side wall of the side frame.

According to the seat frame for the vehicle seat of an embodiment of the invention, the rigidity of the attachment bracket is improved.

According to the seat frame for the vehicle seat of an embodiment of the invention, the bent portion may be formed while suppressing the interference with the actuator.

According to the seat frame for the vehicle seat of an embodiment of the invention, the rigidity of the side frame is improved with respect to the load generated in the side frame during the rotation of the armrest.

According to the seat frame for the vehicle seat of an embodiment of the invention, the fragile portion is satisfactorily deformed when the collision load is applied to the vehicle seat from the rear side.

DETAILED DESCRIPTION

Figure 1:
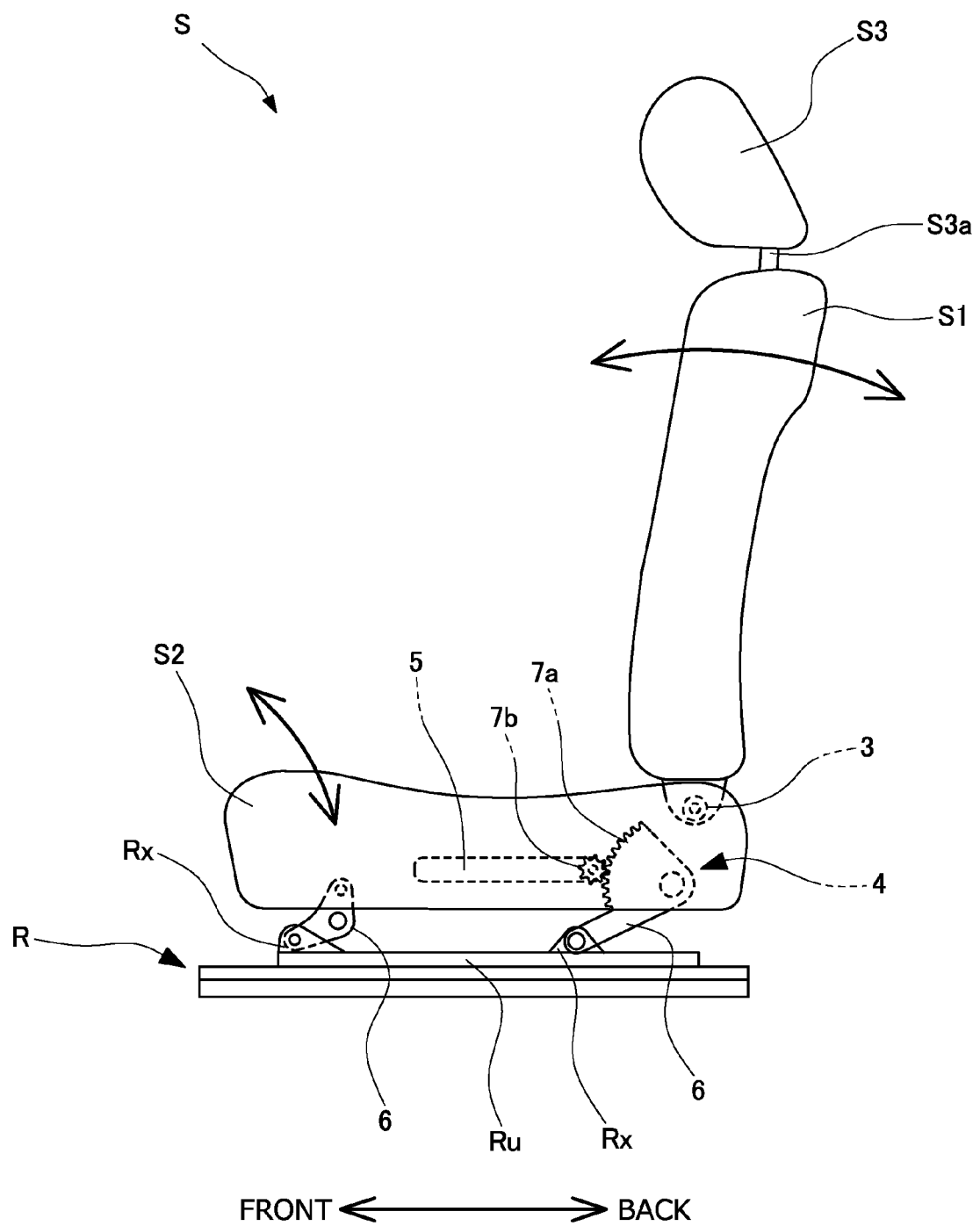
FIG. 1 is a schematic side view illustrating an appearance of a vehicle seat according to an embodiment of the invention.

Hereinafter, a seat frame for a vehicle seat according to various embodiments of the invention will be described with reference to FIGS. 1 to 14. Furthermore, in FIGS. 2, 4, 5, 6, 7, 8, and 9, an actuator and a bolt for fixing the actuator are not illustrated in the drawings in order to comprehensively illustrate the structure of the seat frame. Further, for convenience of description, a height adjustment mechanism 4 and a slide rail mechanism R to be described later are not illustrated in FIG. 2.

In the description below, the front to back direction is a direction that matches the traveling direction of the vehicle. Further, the width direction is a direction that extends along the width of the vehicle, more specifically, the right and left direction, and corresponds to the width direction of the vehicle seat of the invention. Further, the up and down direction is the up and down direction of the vehicle seat. Furthermore, in the description below, the position or posture of each portion of the seat will be described based on a normal state, that is, a seated state of an occupant unless otherwise specified.

First, a basic configuration of a vehicle seat and a seat frame (hereinafter, referred to as a main seat S and a main frame F) according to the embodiment of the invention will be described.

The basic structure of the main seat S is substantially the same as that of a known vehicle seat, and in the embodiment, the main seat is particularly used as a front seat disposed in front of a rear seat. However, the invention is not limited thereto, and may be applied also to a seat frame for a vehicle seat as a rear seat.

Figure 2:
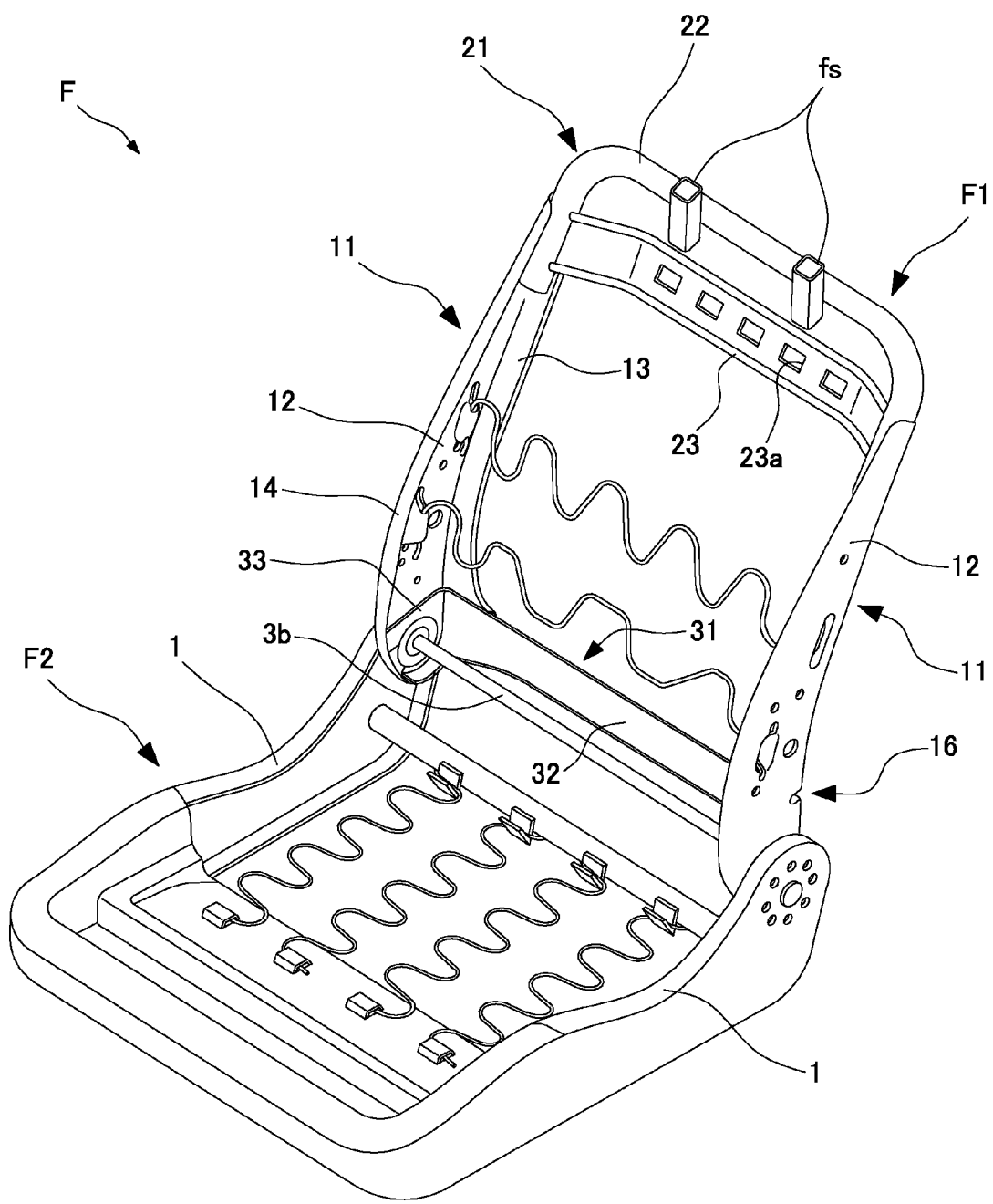
FIG. 2 is a perspective view illustrating an entire seat frame for the vehicle seat according to the embodiment of the invention.

More specifically, the main seat S includes a seat back S1, a seat cushion S2, and a headrest S3 as main components as illustrated in FIG. 1. The main frame F which forms the frame of the main seat S includes a seat back frame F1 equipped in the seat back S1 and a seat cushion frame F2 equipped in the seat cushion S2 as illustrated in FIG. 2. Further, a guide stay fs into which a pillar S3a extending from the lower portion of the headrest S3 is inserted to thereby support the body of the headrest S3 is fixed to the upper portion of the seat back frame F1.

Further, most of the main frame F is formed by metal members and welding, particularly, laser-welding is used as a method of bonding the components of the frame. Each of the seat back frame F1 and the seat cushion frame F2 which are assembled by using such laser-welding is configured to form a rectangular frame as illustrated in FIG. 2.

Then, lower ends of side frames 11 which are provided at both ends of the seat back frame F1 in the width direction are assembled to rear ends of side frames 1 which are provided at both ends of the seat cushion frame F2 in the width direction. In the main frame F, the lower ends of the side frames 11 are assembled to the rear ends of the side frames 1 via reclining mechanisms 3 illustrated in FIG. 4.

The reclining mechanisms 3 are operated when the occupant operates an operation portion (not illustrated) to rotate the seat back S1 so that the seat back tilts forward or backward with respect to the seat cushion S2. In the main seat S, the reclining mechanism 3 is individually provided in each of the side frames 11 which are provided at both ends of the seat back frame F1 in the width direction, and it is attached to a lower portion of an outer surface 12a of each side frame 11 by laser-welding. Further, the reclining mechanism 3 is welded to the rear end of the inner wall surface of the side frame 1 at the surface opposite to the welding side with respect to the side frame 11.

Each reclining mechanism 3 has a known structure and includes a reclining mechanism body 3a and a penetration shaft 3b which extends in the width direction while penetrating reclining mechanism body 3a. Additionally, the penetration shaft 3b rotates; thereby, a driving mechanism (not illustrated) which is provided inside the body is operated. By the operation of the driving mechanism, a portion of the reclining mechanism body 3a, which is bonded to the side frame 11 rotates about the penetration shaft 3b relative to the opposite portion, specifically, to a portion of the seat cushion frame F2, which is bonded to the side frame 1. Accordingly, the side frame 11 to which the reclining mechanism 3 is attached rotates about the penetration shaft 3b relative to the seat cushion S2. That is, the seat back S1 pivots about the penetration shaft 3b relative to the seat cushion S2.

Here, the penetration shaft 3b is a rotation shaft which rotates to drive the reclining mechanism 3 and is a pivot shaft about which the seat back S1 pivots relative to the seat cushion S2 by the reclining mechanism 3. Furthermore, in the main seat S, the penetration shaft 3b is used as a common shaft between the reclining mechanism 3 attached to one side frame 11 and the reclining mechanism 3 attached to the other side frame 11. That is, the penetration shaft 3b penetrates a side wall 12 of one side frame 11 and extends to the other side frame 11 along the width direction to further penetrate the side wall 12 of the same side frame 11.

Figure 5:
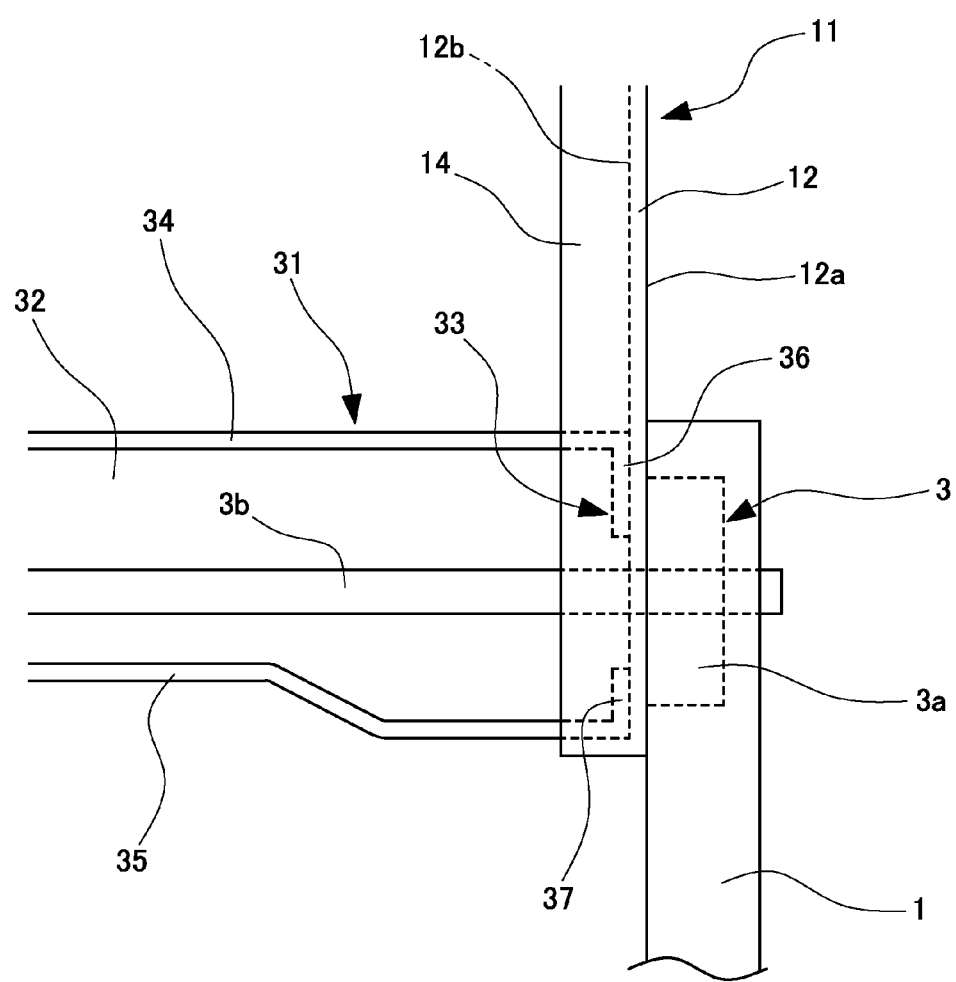
FIG. 5 is a front view illustrating a positional relation among a side frame, a connection frame, and a reclining mechanism.

Also, as illustrated in FIG. 5, both ends of the penetration shaft 3b respectively penetrate the corresponding reclining mechanism bodies 3a and further penetrate the side frames 1 of the seat cushion frame F2, which are located at the side of the reclining mechanism bodies 3a. That is, in the main seat S, the penetration shaft 3b is rotatably provided while penetrating the side wall 12 of the side frame 11 and the side frame 1 in the width direction. In other words, the reclining mechanism 3 is attached to the side wall 12 while the penetration shaft 3b penetrates the side wall 12 of the side frame 11.

Figure 10:
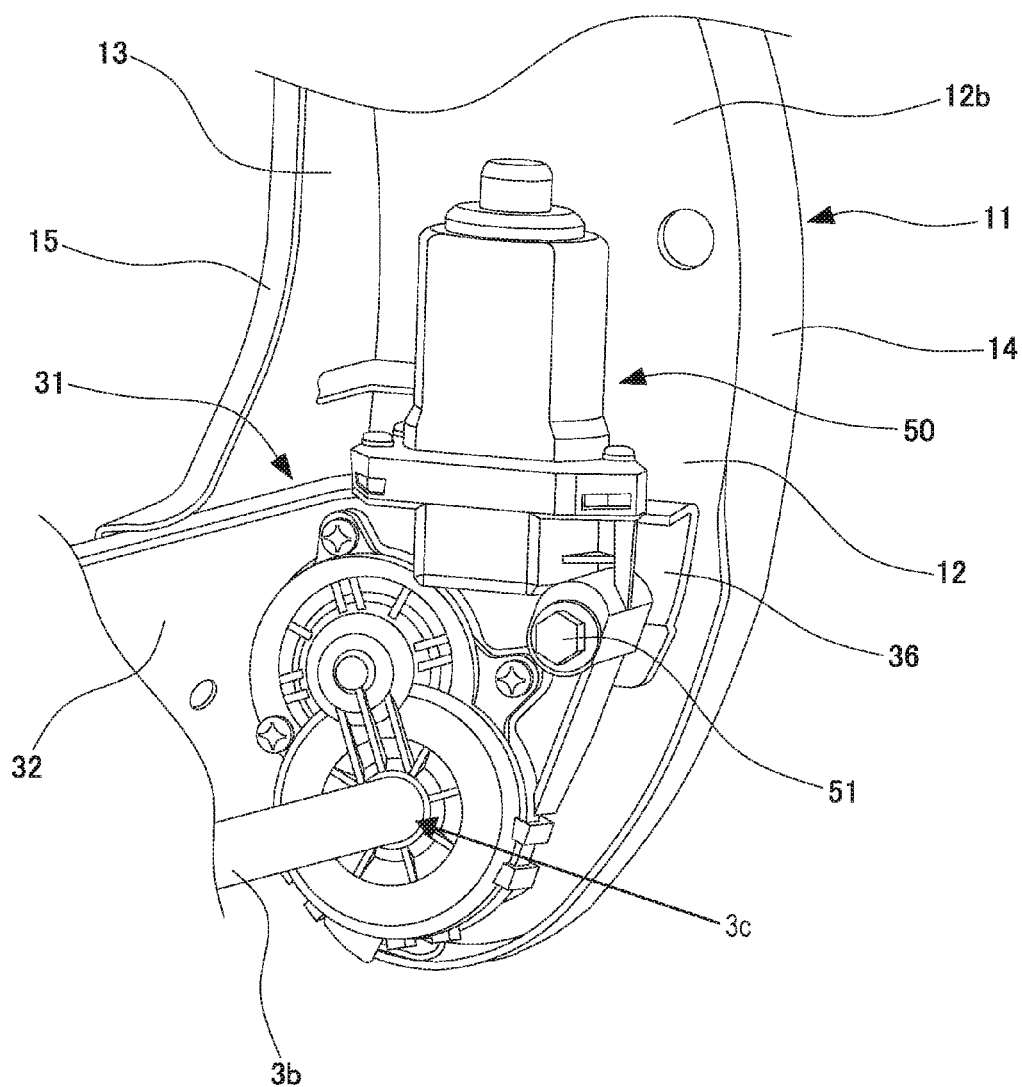
FIG. 10 is an external perspective view illustrating an actuator according to the embodiment of the invention.

Furthermore, in the main seat S, the penetration shaft 3b is rotated by power applied by an actuator 50 as another member illustrated in FIG. 10. Specifically, the penetration shaft 3b is inserted in an insertion hole formed in an output shaft (not illustrated) of the actuator 50, and it is engaged with the output shaft. Thus, when the output shaft of the actuator 50 rotates, the penetration shaft 3b which is inserted in the output shaft rotates. As a result, the driving force of the actuator 50 is transmitted to the reclining mechanism 3 via the penetration shaft 3b so that the reclining mechanism 3 is operated.

In the main seat S, the actuator 50 is disposed at the opposite side to the reclining mechanism 3 via the side wall 12 while being engaged with a portion 3c of the penetration shaft 3b, which is at the inner portion of the side wall in the width direction while penetrating the side wall 12 of the side frame 11.

Furthermore, the actuator 50 is fixed to the side frame 11 by a bolt to regulate the rotation of the actuator 50 relative to the side frame 11 when the output shaft is rotated.

The slide rail mechanism R which slides on the main seat S relative to the vehicle body floor in the front to back direction is disposed at the lower position of the seat cushion S2. Additionally, in the main seat S, a height adjustment mechanism 4 for adjusting the seat height is provided between the seat cushion S2 and the slide rail mechanism R in the up and down direction. The height adjustment mechanism 4 is operated when the occupant operates an operation lever 5 illustrated in FIG. 1.

Specifically, the height adjustment mechanism 4 adjusts the seat height by rotating a rotary link 6 connecting the seat cushion frame F2 and the slide rail mechanism R to each other by way of a driving force generated by the operation of the operation lever 5.

More specifically, four rotary links 6 are provided in total to be located at both ends of each of the front and rear ends of the seat cushion frame F2 in the width direction. One end of each rotary link 6 is rotatably supported by a support portion Rx which is provided on an upper rail Ru of the slide rail mechanism R to protrude upward. Further, the other end of each rotary link 6 is rotatably attached to the side frame 1 of the seat cushion frame F2.

A sector gear 7a is formed at the rear rotary link 6 out of the rotary links 6, which is located at one end side of the rotary links 6 in the width direction, and a pinion gear 7b engages with the sector gear 7a. The pinion gear 7b is connected to the operation lever 5 by a connection shaft (not illustrated). Accordingly, when the operation lever 5 is operated, the pinion gear 7b rotates along with the connection shaft so that the engagement position between the pinion gear 7b and the sector gear 7a changes. In accordance with this change of the engagement position, the rotary link 6 provided with the sector gear 7a rotates, and the other rotary link 6 also rotates to follow the rotation of the rotary link 6. As a result, the seat body including the seat cushion S2 is moved upward so that the seat height is adjusted.

Furthermore, in the main seat S, the operation lever 5 is set to be located at the side of the seat cushion S2, and a brake mechanism (not illustrated) is provided between the side frame 1 of the seat cushion frame F2 and the operation lever 5. The brake mechanism applies a friction force to the connection shaft, connecting the operation lever 5 and the pinion gear 7b to each other, during a period in which the height adjustment mechanism 4 is not driven, that is, the operation lever 5 is not operated. Accordingly, the unintended rotation of the connection shaft is restricted so that the seat height is maintained.

Next, the seat back frame F1 of the main frame F will be described in detail.

Figure 3:
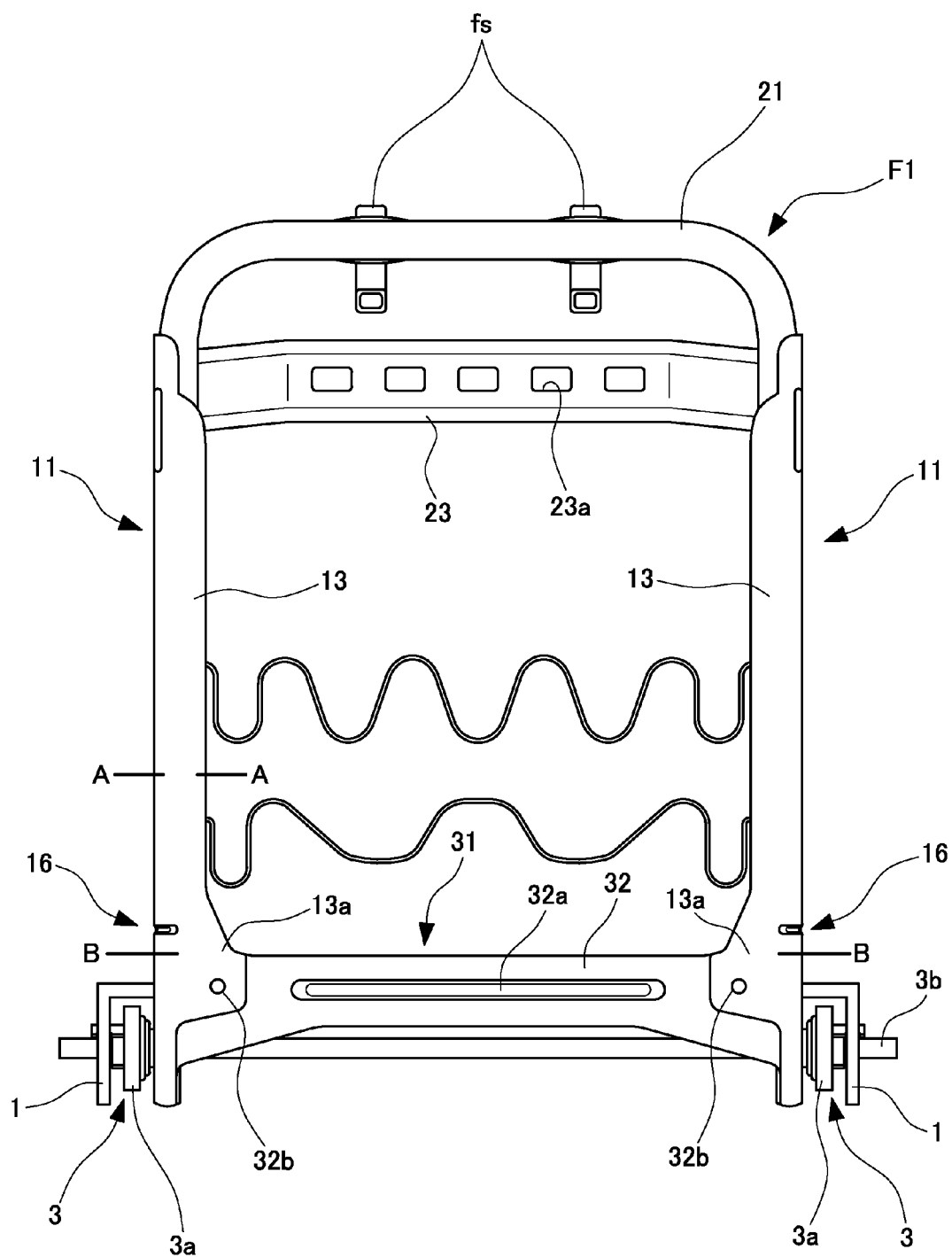
FIG. 3 is a rear view illustrating the seat frame for the vehicle seat according to the embodiment of the invention.

As illustrated in FIGS. 2 and 3, the seat back frame F1 includes the side frames 11 which are disposed at both ends of the seat back frame F1 in the width direction, an upper frame 21 which connects the upper ends of the side frames 11, and a lower member frame 31 which serves as a connection frame connecting the lower ends of the side frames 11 to each other.

As illustrated in FIGS. 2 and 3, the upper frame 21 is a portion that forms the upper end of the seat back frame F1. The upper frame 21 includes a bent portion 22 which is bent in a downward U-shape so that both ends of the upper frame 21 are directed downward, and an upper member frame 23 which is laid between one end of the bent portion 22 and the other end thereof.

The bent portion 22 is formed by bending a metallic pipe. Further, two crushed areas are formed in the extension portion of the bent portion 22 in the width direction so that flat surfaces are formed at the front side of the bent portion 22. The crushed areas are formed at the bent portion 22 to be bilaterally symmetrical to each other, and the above-described guide stays fs are fixed by laser-welding to the flat surfaces which are formed at the front side of the crushed areas.

The upper member frame 23 is formed by processing a metal plate, and the ends of the upper member frame 23 are respectively laser-welded to the downwardly-extending bent ends of the bent portion 22. Furthermore, plural rectangular openings 23a are formed at predetermined intervals in an area located at the center portion of the upper member frame 23 in the extension direction.

The side frames 11 are portions which form both ends of the seat back frame F1 in the width direction and extend in the up and down direction. In the main seat S, each side frame 11 is substantially bent in an arc shape so that the upper end is slightly located behind the lower end as illustrated in FIG. 2. Further, in the main seat S, each side frame 11 is formed as a single member, and is specifically formed by processing one metal plate.

The structure of each side frame 11 will be described in more detail. Furthermore, since the side frames 11 which are disposed at both ends in the width direction are configured to be bilaterally symmetrical to each other, only the structure of one side frame 11 will be described below.

Figure 8:
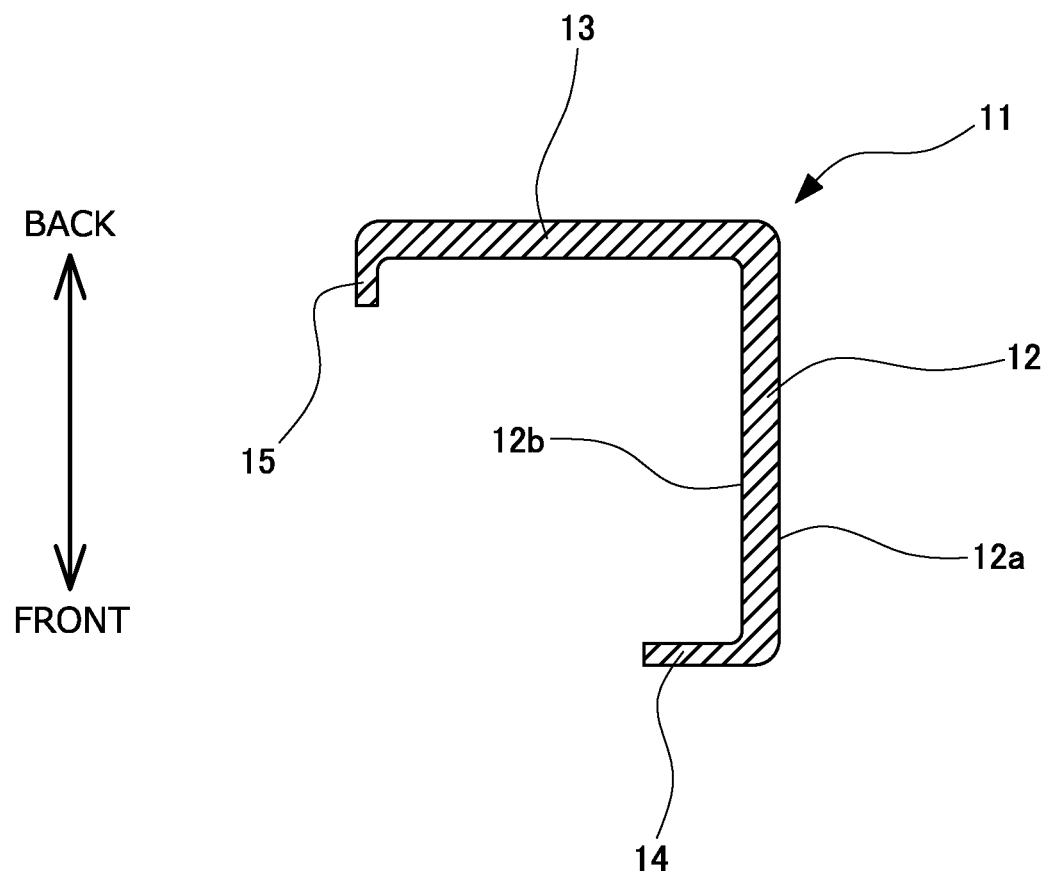
FIG. 8 is a cross-sectional view illustrating a structure of the side frame when taken along the line A-A of FIG. 3.

As illustrated in FIG. 8, each side frame 11 includes the side wall 12 which is located at the outward in the width direction and a rear wall 13 which extends inward in the width direction from the rear end of the side wall 12. The side wall 12 extends substantially straight in the up and down direction. When viewed from the side in the width direction, the side wall is configured so that the upper end is formed in a pointed shape which narrows toward its upper end, that the center portion is formed in a smoothly curved shape, and that the lower end is formed in a semi-oval shape.

The side wall 12 is provided with plural holes. One hole 12c of the plural holes is formed at the lower end of the side wall 12, and the penetration shaft 3b for driving the reclining mechanism 3 is inserted into the hole 12c. Further, the other hole is a bolt hole 12d which is located above the hole 12c into which the penetration shaft 3b is inserted, and a bolt 51 for stopping the rotation of the actuator 50 is inserted into the bolt hole 12c. In addition, one of the remaining holes is a hole for fixing the side frame 11 when the seat back frame F1 is assembled, in particular, when members configuring the seat back frame F1 are welded, and a fixing jig (not illustrated) used for the welding operation is inserted into the hole 12c.

Further, as described above, the reclining mechanism 3 is attached to the outer surface 12a of the side surfaces of the side wall 12, which is located at the outward in the width direction. More specifically, in the main seat S, the reclining mechanism 3 is attached by laser-welding to a portion which is located slightly above the lower end of the side wall 12. Here, in a case where the reclining mechanism 3 is attached to the outer surface 12a of the side wall 12 by laser-welding, the laser is radiated to an inner surface 12b of the side surface of the side wall 12, which is located at the back side of the outer surface 12a in the width direction. Therefore, unevenness is formed as a welding mark on the inner surface 12b.

Figure 7:
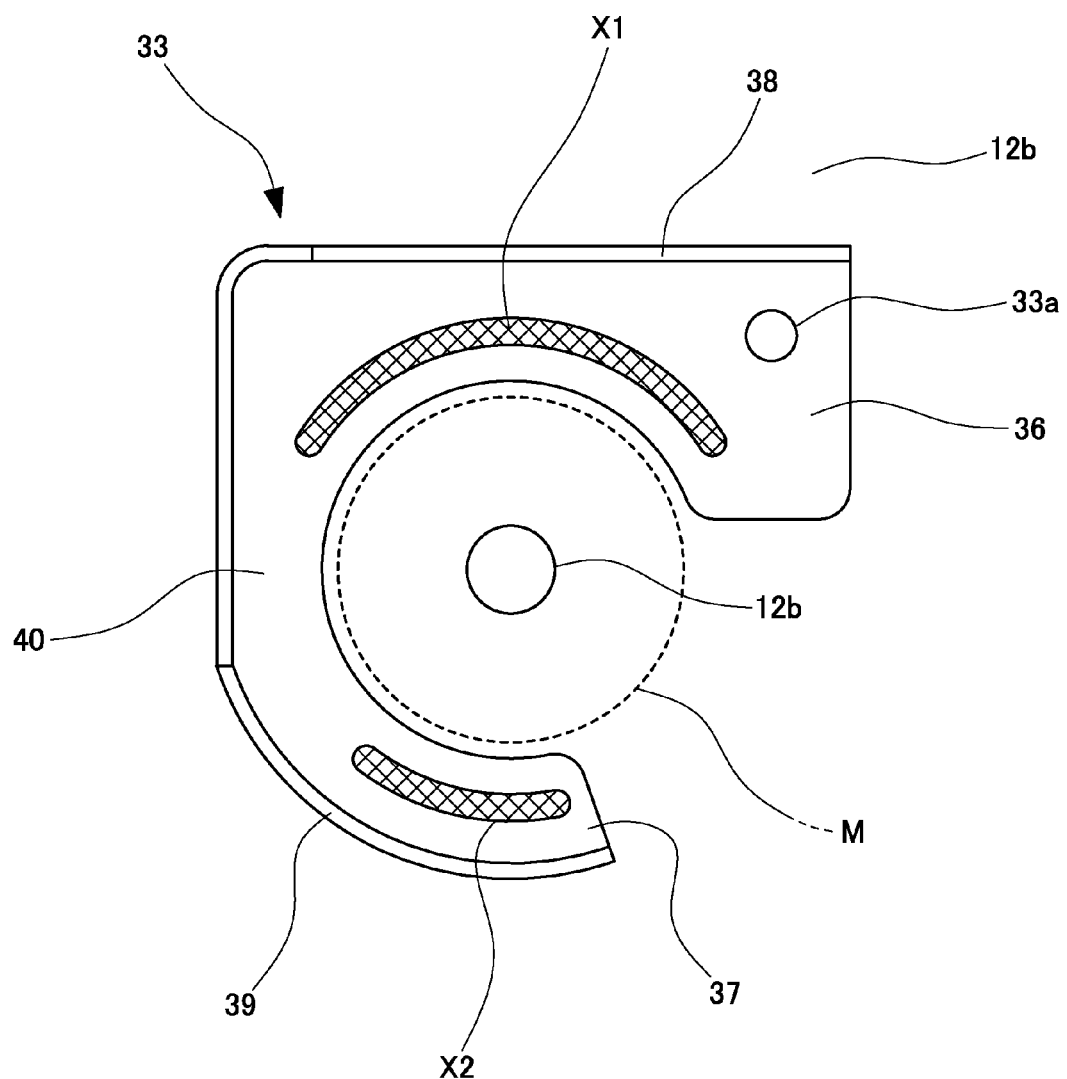
FIG. 7 is a side view illustrating a welding position between the side frame and the connection frame.

Furthermore, in the main seat S, a portion of the reclining mechanism 3, which is bonded to the side wall 12 of the side frame 11, more specifically, a portion of the reclining mechanism body 3a, which faces the side wall 12, is formed in a circular shape. Thus, in the main seat S, an area in which the reclining mechanism 3 is attached to the outer surface 12a of each side wall 12 of the side frame 11 is formed as a circular area M when viewed from the width direction as illustrated in FIG. 7. Furthermore, a hole into which the penetration shaft 3b is inserted is formed at the center position of the circular area M.

Figure 4:
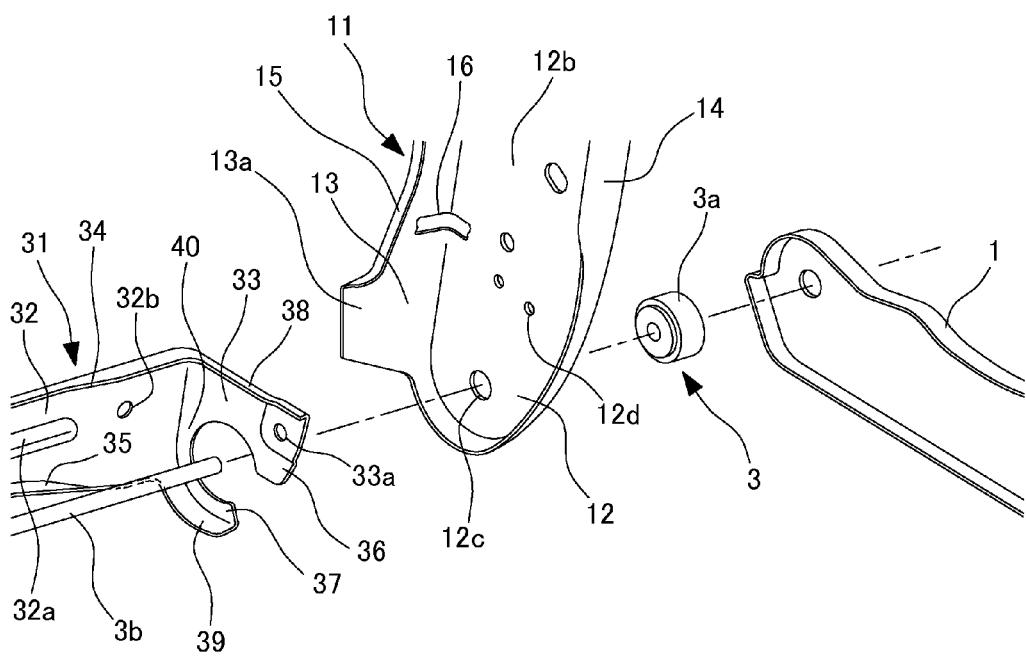
FIG. 4 is an exploded perspective view illustrating the periphery of a side frame in the seat frame.

Further, as illustrated in FIGS. 4 and 8, a side wall side flange 14 which is bent inward in the width direction is formed at the front end of the side wall 12. The side wall side flange 14 corresponds to a side wall side bent portion, and it is formed from the upper end of the side wall 12 to the lower end thereof in order to reinforce the side wall 12. Here, the lower end of the side wall 12 is formed in a semi-oval shape as described above, and the side wall side flange 14 which is provided at the lower end of the side wall 12 is formed in a circular-arc shape to wrap around the outer edge of the lower end of the side wall 12 from the front side to the rear side.

The rear wall 13 is adjacent to the rear end of the side wall 12 while intersecting the side wall 12, and in the main seat S, an angle of about 90° is formed between the rear wall 13 and the side wall 12. In other words, the outer end of the rear wall 13 in the width direction forms a corner of the side frame 11 along with the rear end of the side wall 12.

Further, the upper end of the rear wall 13 is slightly lower than the upper end of the side wall 12, and the lower end of the rear wall 13 is slightly higher than the lower end of the side wall 12. Additionally, as illustrated in FIG. 3, the lower end of the rear wall 13 is provided with a member frame attachment portion 13a which is substantially formed in a trapezoid shape and of which the inward extension portion in the width direction is larger than that of a portion above the member frame attachment portion. The lower member frame 31 to be described later is attached to the member frame attachment portion 13a.

Further, an elongated hole 16 is formed at a boundary portion between the side wall 12 and the rear wall 13, that is, at the corner of the side frame 11, to be substantially horizontal across both the side wall 12 and the rear wall 13. The elongated hole 16 is formed at the corner of the side frame 11; thereby, the side frame 11 is easily deformed to be inclined backward, for example, when a collision load is applied to the vehicle equipped with the main seat S from the rear side. That is, the elongated hole 16 corresponding to a fragile portion is deformed first in the side frame 11 when a collision load is applied from the rear side (in a precise sense, the elongated hole is deformed to be crushed in the up and down direction), and it becomes a start point when the side frame 11 is deformed.

Further, as illustrated in FIGS. 4 and 8, the inner end of the rear wall 13 in the width direction is provided with a rear wall side flange 15 which is bent forward. The rear wall side flange 15 is formed downward from the upper end of the rear wall 13 to reinforce the rear wall 13, and it is formed along the upper end of the member frame attachment portion 13a. Further, the rear wall side flange 15 is also formed in an area which is located below the member frame attachment portion 13a in the rear wall 13. The flange 15 is not formed at the inner portion of the member frame attachment portion 13a in the width direction and at the lower end side portion of the outer edge of the member frame attachment portion 13a for the purpose of preventing the interference of the member frame attachment portion 13a with the lower member frame 31.

Furthermore, as illustrated in FIG. 4, the rear wall side flange 15 formed at the lower end of the rear wall 13 is configured so that its outward end in the width direction is formed continuously to the side wall side flange 14 which is formed at the lower end of the side wall 12 to be deflected toward the rear side thereof. Therefore, the rigidity of the entire side frame 11 is further improved.

Figure 9:
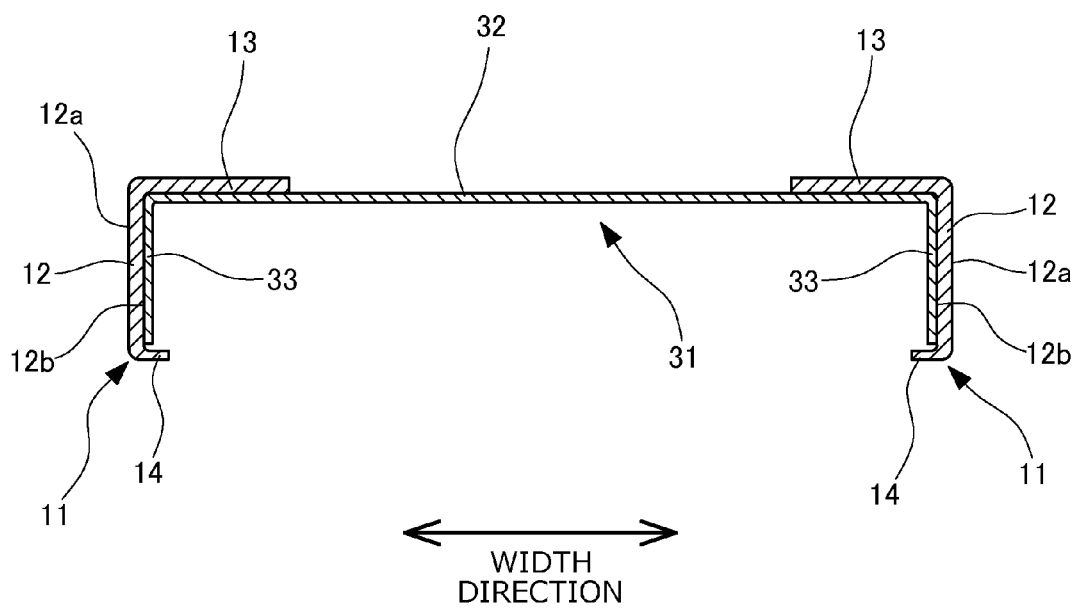
FIG. 9 is a cross-sectional view illustrating the connection frame attached to the side frame when taken along the line B-B of FIG. 3.

As illustrated in FIGS. 2 and 9, the lower member frame 31 is substantially formed in a U-shape when viewed from the upside, and it is formed by processing one metal plate. The lower member frame 31 includes a first extension portion 32 which extends in the width direction and a second extension portion 33 which extends forward from both ends of the first extension portion 32 in the width direction.

The first extension portion 32 is a portion which is disposed between the side frames 11 in the width direction, and it is attached to particularly the above-described member frame attachment portion 13a of the rear wall 13 of the side frame 11. More specifically, both ends of the first extension portion 32 in the extension direction are attached to the member frame attachment portion 13a by laser-welding while being in contact with the front surfaces of the member frame attachment portions 13*a*.

Furthermore, in the main seat S, the lower member frame 31 is attached to a portion of the side frame 11, which is located below the portion provided with the elongated hole 16. That is, the lower member frame 31 is attached to the side frame 11 at a position avoiding the elongated hole 16 in the up and down direction. Accordingly, an effect that the rigidity is improved by the attachment of the lower member frame 31 is difficult to be obtained in the vicinity of the elongated hole 16; therefore, the elongated hole 16 is easily deformed when a collision load is applied from the rear side.

Figure 6:
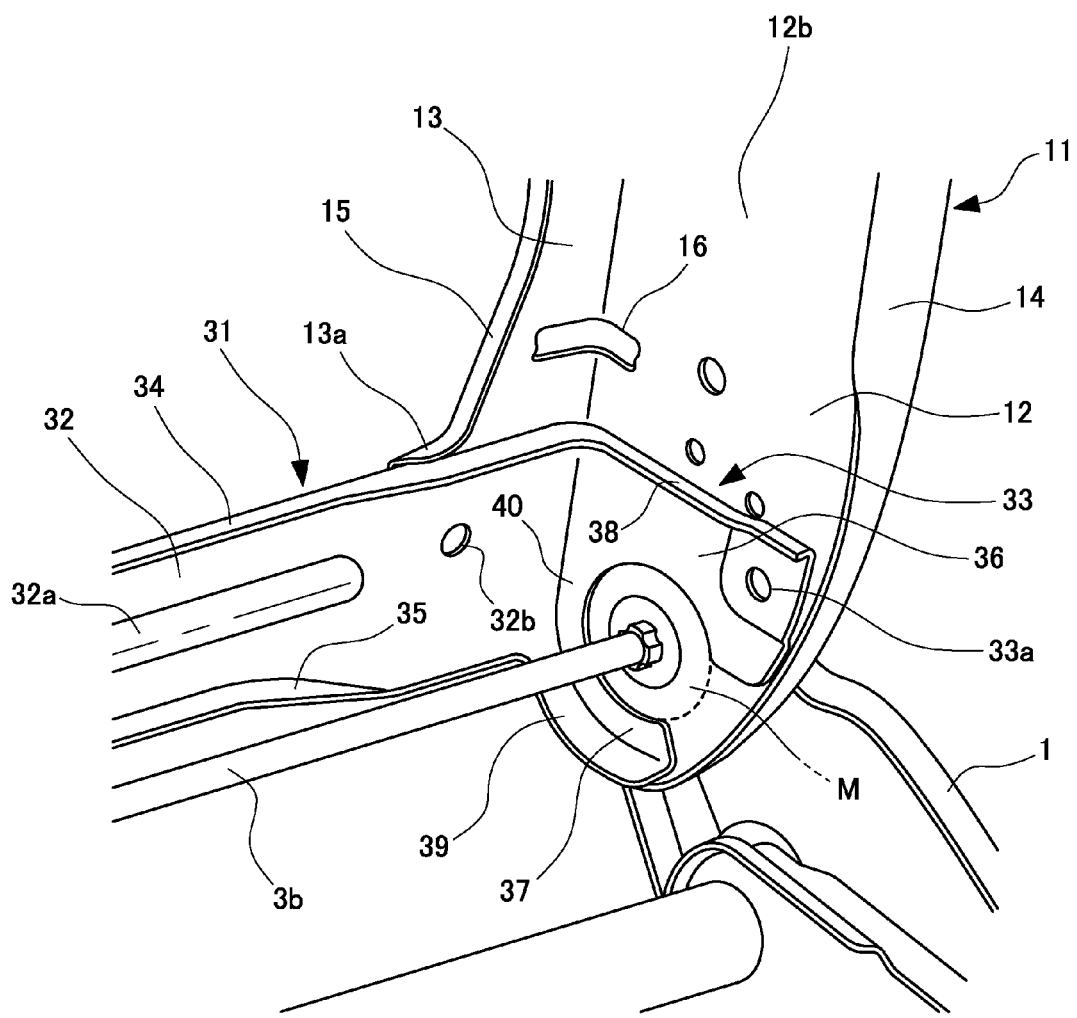
FIG. 6 is a perspective view illustrating a state where the side frame and the connection frame are bonded to each other.

Further, as illustrated in FIG. 6, the end of the first extension portion 32 in the extension direction is provided with a hole 32*b* which communicates with a through-hole (not illustrated), formed in the member frame attachment portion 13*a*, in a state where the first extension portion 32 is attached to the member frame attachment portion 13*a*. The hole 32*b* is a hole which is used to fix the lower member frame 31 when the seat back frame F1 is assembled, in particular, when the members configuring the seat back frame F1 are welded, and a fixing jig (not illustrated) is inserted into the same hole 32*b* during a welding operation.

The shape of the first extension portion 32 will be described in more detail. As illustrated in FIG. 3, the lower end position of the first extension portion 32 at the center portion in the extension direction is located slightly above the lower end position of the end in the extension direction. That is, in the main seat S, the first extension portion 32 is formed in a shape so that the lower end is slightly raised at the center portion in the extension direction. Since the first extension portion 32 having such a shape is provided, the main seat S may be easily used as a front seat.

An illustration for clarity is a case in which the legs of the occupant sitting on the rear seat may enter a space located below the lower member frame 31 of the front seat. Here, if the first extension portion 32 of the lower member frame 31, which is located above the legs of the occupant, is provided so that the lower end of the center portion in the extension direction is located above the lower end of the end in the extension direction, a problem that the legs of the occupant interfere with the lower member frame 31 can be avoided.

The end of the first extension portion 32 in the extension direction is wider than the center portion in the extension direction in the up and down direction, and hence the rigidity of the lower member frame 31 is ensured.

Further, as illustrated in FIG. 3, a bulged portion 32*a* which is bulged in a circular-arc shape from the front surface (in other words, a portion of the rear surface, which is depressed in a circular-arc shape) is formed at the center portion of the first extension portion 32 in the up and down direction. The bulged portion 32*a* is a so-called reinforcement bead, and it is formed in a slightly elongated shape in the extension direction of the first extension portion 32.

Further, as illustrated in FIG. 4 or 6, the upper end of the first extension portion 32 is provided with a first extension portion upper flange 34 which is bent forward. The first extension portion upper flange 34 is formed from one end of the first extension portion 32 to the other end thereof in the extension direction in order to reinforce the first extension portion 32.

Moreover, in the main seat S, as illustrated in FIG. 6, the rear wall side flange 15 (particularly, the inner end of the flange 15 in the width direction) which is formed at the upper end of the member frame attachment portion 13*a* is in contact with a portion of the first extension portion upper flange 34, which is slightly close to the center of the first extension portion 32 in relation to the end position of the first extension portion 32 in the extension direction. That is, in the main seat S, the lower member frame 31 is attached to the member frame attachment portion 13*a* so that the rear wall side flange 15 and the first extension portion upper flange 34 are provided continuously to each other. Therefore, the lower member frame 31 and the side frame 11 are strongly integrated with each other, and hence the rigidity in the vicinity of the attachment portion of the lower member frame 31 in the side frame 11 is further improved.

Further, the lower end of the first extension portion 32 is provided with the first extension portion lower flange 35 which is bent forward and is formed from one end of the first extension portion 32 to the other end thereof in the extension direction. Therefore, the rigidity of the lower member frame 31 is further improved.

The second extension portion 33 is adjacent to each of both ends of the first extension portion 32 in the extension direction while intersecting the first extension portion 32, and in the main seat S, an angle of about 90° is formed between the first extension portion 32 and the second extension portion 33. In other words, the rear end of the second extension portion 33 forms a corner of the lower member frame 31 along with the end of the first extension portion 32 in the extension direction.

Then, in the main seat S, the lower member frame 31 is attached to the member frame attachment portion 13*a* so that the corner of the lower member frame 31 overlaps the corner of the side frame 11 as illustrated in FIG. 6. That is, the second extension portion 33 is located at the inside in the width direction in relation to the side wall 12 of the side frame 11 and overlaps the side wall 12. More specifically, the second extension portion 33 is attached to the side wall 12 by laser-welding while being in contact with the inner surface 12*b* of the side wall 12.

As described above, in the main seat S, since the second extension portion 33 of the lower member frame 31 is disposed while being in contact with the inner surface 12*b* of the side wall 12 of the side frame 11, the rigidity of the side wall 12 of the side frame 11, in particular, the rigidity with respect to the load particularly exerted in the width direction is improved, and hence the side frame 11 is prevented from tilting inward. That is, the second extension portion 33 is disposed to overlap the inside of the side wall 12 of the side frame 11; thereby, the rigidity can be improved to the extent that the side frame 11 is prevented from tilting inward.

Figure 11:
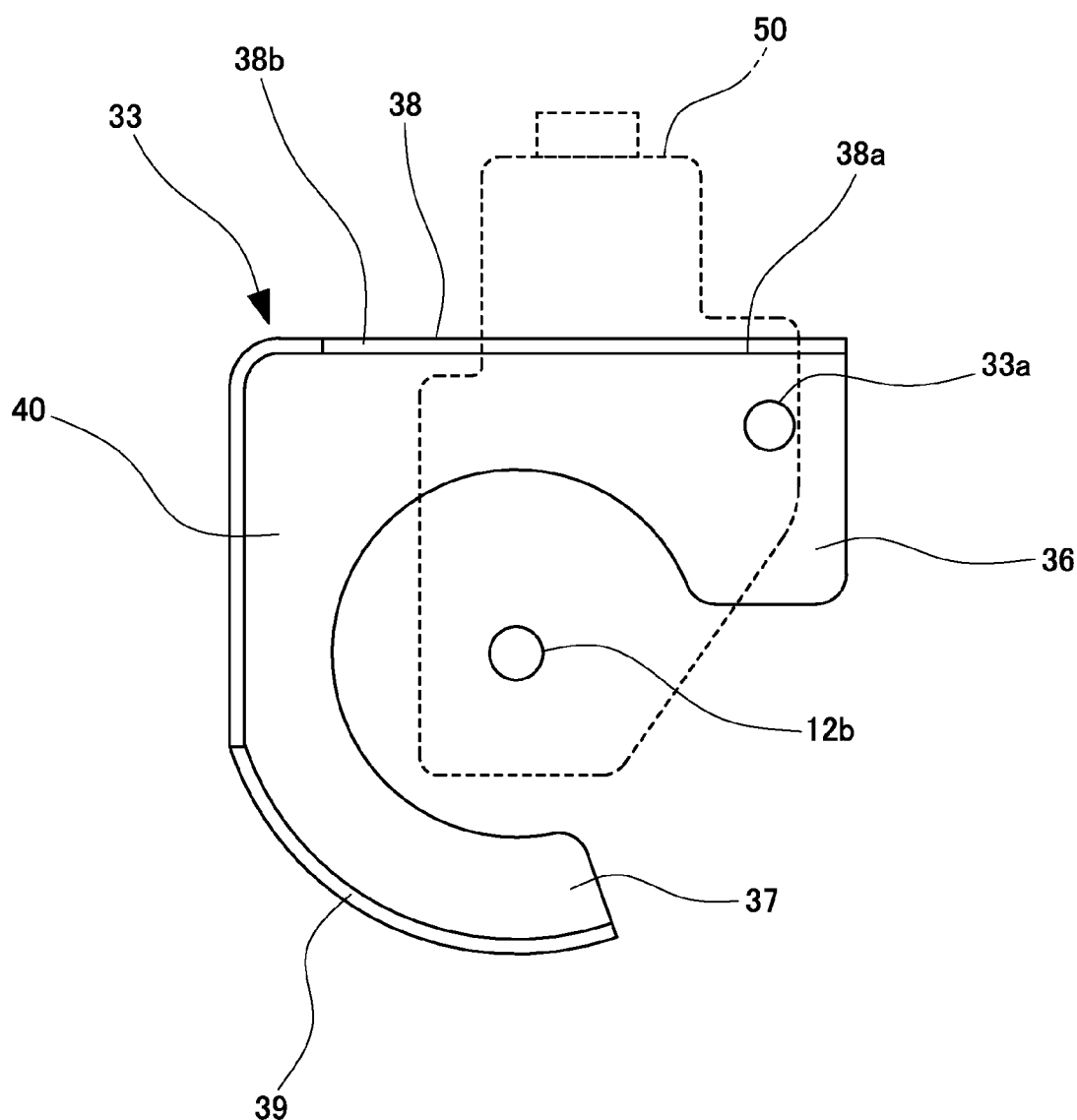
FIG. 11 is a side view illustrating a positional relation among the side frame, the connection frame, and the actuator.

Further, in the main seat S, the second extension portion 33 serves as an attachment bracket used to attach the actuator 50 to the inside of the side wall 12 of the side frame 11 in the width direction as illustrated in FIG. 11. That is, in the main seat S, in the case of attaching the actuator 50 to the inner surface 12*b* of the side wall 12 of the side frame 11, the attachment bracket is bonded to the inside of the side wall 12 in the width direction and the actuator 50 is fixed to the attachment bracket. Specifically, the attachment bracket is provided with a bolt hole 33*a*, and the bolt 51 for stopping the rotation of the actuator 50 is inserted into the both bolt holes 12*d* and 33*a* while the bolt hole 33*a* communicates with the bolt hole 12*d* formed in the side wall 12 of the side frame 11.

Additionally, in the main seat S, the second extension portion 33 of the lower member frame 31 serves as the attachment bracket. In other words, in the main seat S, the attachment bracket is disposed at each of both ends of the lower member frame 31, and is integrated with the lower member frame 31. In this way, a portion of the lower member frame 31 is used as the attachment bracket; thereby, the number of components is reduced compared to the configuration in which the attachment bracket is provided as a separate member.

The shape of the second extension portion 33 will be described in more detail. As illustrated in FIGS. 6 and 7, the second extension portion 33 has a C-shape when viewed from the width direction. That is, the center portion of the second extension portion 33 provided in the main seat S is punched in a circular shape. Further, a lower half area of the front end of the second extension portion 33 is notched to be formed continuously to the circular punched portion. When such punching and notching are performed, the second extension portion 33 includes an upper portion 36 which is disposed above the circular punched portion and a lower portion 37 which is disposed below the circular punched portion. Additionally, both the upper portion 36 and the lower portion 37 are bonded to the side wall 12 by laser-welding while being in contact with the inner surface 12b of the side wall 12 of the side frame 11.

The circular punched portion of the second extension portion 33 is not bonded to the side wall 12 of the side frame 11. Additionally, in the main seat S, the reclining mechanism 3 is disposed at the position opposite to the circular punched portion in a state where the side wall 12 is arranged between the circular punched portion and the reclining mechanism 3. That is, in the main seat S, an area in which the circular punched portion is located in the side wall 12 of the side frame 11 corresponds to an area in which the reclining mechanism 3 is attached to the outer surface 12a.

In other words, in the main seat S, an area in which the upper portion 36 and the lower portion 37 of the second extension portion 33 are in contact with the inner surface 12b in the side wall 12 of the side frame 11 is separated from an area in which the reclining mechanism 3 is attached to the outer surface 12a. Specifically, as described above, there is a case in which an unevenness as a welding mark generated by laser-welding may be formed on the inner surface 12b in the area in which the reclining mechanism 3 is attached to the outer surface of the side wall 12. The second extension portion 33 is attached to the inner surface 12b of the side wall 12 while avoiding a portion at which such unevenness is formed; therefore, the lower member frame 31 including the second extension portion 33 can be satisfactorily attached to the side wall 12.

In the main seat S, the area in which the reclining mechanism 3 is attached to the outer surface 12a in the side wall 12 is formed in a circular shape as viewed from the width direction as described above. The center portion of the second extension portion 33 of the lower member frame 31 is punched in a circular shape to match the circular area M. Additionally, in the main seat S, the second extension portion 33 is bonded to the side wall 12 so that the outer edge of the circular area M matches the inner edge of the circular punched portion in the second extension portion 33.

That is, in the main seat S, an area in which the second extension portion 33 are in contact with the inner surface 12b in the side wall 12 is formed as a C-shaped area which follows the outer edge of the circular area M when viewed from the width direction. More specifically, as illustrated in FIGS. 6 and 7, a portion which is located at the lower side in the center portion of the upper portion 36 of the second extension portion 33 in the front to back direction is notched in a semi-circular shape. Additionally, the second extension portion 33 is attached to the side wall 12 to follow the edge of the notch and the upper portion of the outer edge of the circular area M. In other words, the upper portion 36 is a portion which is disposed above the circular area M in the second extension portion 33.

As illustrated in FIGS. 6 and 7, the lower portion 37 of the second extension portion 33 extends forward in a circular-arc shape. Additionally, the second extension portion 33 is attached to the side wall 12 so that the lower portion 37 follows the lower portion of the outer edge of the circular area M. In other words, the lower portion 37 is a portion of the second extension portion 33, which is located below the circular area M, and it extends in a circular-arc shape along the outer edge of the circular area M.

As described above, in the main seat S, the second extension portion 33 is formed in a C-shape that follows the outer edge of the circular area M (the area in which the reclining mechanism 3 is attached in the side wall 12 of the side frame 11) when viewed from the width direction. In addition, the second extension portion 33 is bonded to the side wall 12 so that the circular area M matches the circular punched portion of the second extension portion 33. In contrast, in the case of bonding the second extension portion 33 to the side wall 12, the circular area M may be matched to the circular punched portion of the second extension portion 33. Therefore, an operation for attaching the lower member frame 31 while avoiding the attachment portion of the reclining mechanism 3 in the side wall 12 of the side frame 11 can be easily performed.

Particularly, in the case where the seat back frame F1 of the main seat S is assembled, the reclining mechanism 3 is first attached to the side wall 12 of the side frame 11 by laser-welding, and then the lower member frame 31 is attached to the side frame 11. If the circular area M matches the circular punched portion of the second extension portion 33 when the seat back frame F1 is assembled according to such an assembling order, it is possible to more easily attach the lower member frame 31 to avoid the attachment portion of the reclining mechanism 3 in the side wall 12 of the side frame 11. That is, in the case where the seat back frame F1 is assembled according to the above-described assembling order, it is more effective to punch the center portion of the second extension portion 33 in a circular shape to follow the outer edge of the circular area M.

Additionally, the rear ends of the upper portion 36 and the lower portion 37 are connected to each other via a connection portion 40. The connection portion 40 is located behind an area in which the reclining mechanism 3 is attached in the side wall 12, and it is formed in a shape that follows the outer edge of the corresponding area. The front ends of the upper portion 36 and the lower portion 37 are separated from each other in the up and down direction.

As described above, the shape of the second extension portion 33 that serves as the attachment bracket of the actuator is formed as a shape that avoids an area in which the reclining mechanism 3 is attached in the side wall 12 of the side frame 11. Accordingly, the second extension portion 33 may be bonded to the inner surface 12b of the side wall 12 of the side frame 11 while avoiding the interference with the rotation shaft for driving the reclining mechanism 3, that is, the penetration shaft 3b. Further, since the front end of the second extension portion 33 is opened, the second extension portion 33 may be easily bonded to the inner surface 12b of the side wall 12 while avoiding the interference with the penetration shaft 3b.

Furthermore, as described above, in the main seat S, since the second extension portion 33 is formed in a C-shape that follows the outer edge of the attachment area of the reclining mechanism 3 in the side wall 12 of the side frame 11 when viewed from the width direction, the second extension portion 33 may be effectively bonded to the inner surface 12b of the side wall 12.

Further, in the main seat S, the lower portion 37 of the second extension portion 33 extends in a circular-arc shape to wrap around from the rear side of the penetration shaft 3b to the front side of the penetration shaft 3b in the state where the second extension portion 33 is bonded to the side wall 12. Similarly, the upper portion 36 of the second extension portion 33 also extends from the rear side of the penetration shaft 3b to the front side of the penetration shaft 3b. With such a configuration, the lower member frame 31 may be attached to the side wall 12 of the side frame 11 while avoiding the attachment portion of the reclining mechanism 3 in the side wall 12 of the side frame 11 and further avoiding the interference with the penetration shaft 3b. Further, since a portion of which the rigidity is improved by the attachment of the lower member frame 31 in the side wall 12 of the side frame 11 extends in the front to back direction, the rigidity of the side frame 11 with respect to the load exerted in the width direction is improved.

Further, in the main seat S, as described above, the upper portion 36 and the lower portion 37 of the second extension portion 33 are respectively bonded to the side wall 12 of the side frame 11 by laser-welding. Additionally, in the main seat S, as illustrated in FIG. 7, a welding area X1 between the upper portion 36 and the side wall 12 extends in a circular-arc shape in the front to back direction so that a portion of the welding area X1 is located in front of the penetration shaft 3b. Similarly, a welding area X2 between the lower portion 37 and the side wall 12 extends in a circular-arc shape in the front to back direction so that a portion of the welding area X2 is located behind the penetration shaft 3b.

As described above, in the main seat S, since the welding areas X1 and X2 are formed to have certain lengths in the front to back direction, the upper portion 36 and the lower portion 37 of the second extension portion 33 are respectively and satisfactorily fixed to the side wall 12 of the side frame 11. Further, since the welding areas X1 and X2 extend in the front to back direction, it is possible to ensure the strength with respect to the load exerted in the front to back direction. Accordingly, even when the load exerted in the front to back direction acts on the side frame 11 or the lower member frame 31, it is possible to stably maintain a state where the second extension portion 33 of the lower member frame 31 is bonded to the side wall 12 of the side frame 11 by suppressing the detachment in the welding areas X1 and X2.

Furthermore, in the main seat S, the welding area X1 between the upper portion 36 and the side wall 12 is a circular-arc area which corresponds to about ⅓ of the circumference about the penetration shaft 3b, and the welding area X2 between the lower portion 37 and the side wall 12 is a circular-arc area which corresponds to about ⅙ of the circumference. Further, both welding areas X1 and X2 are separated from each other. In this way, both welding areas X1 and X2 are separated from each other while not satisfying one revolution on the circumference about the penetration shaft 3b. For this reason, in the case where the seat back frame F1 is assembled, the welding operation may be more easily performed compared to the case where the welding areas are continuously welded by laser by one revolution of the circumference about the penetration shaft 3b.

Further, in the main seat S, as illustrated in FIG. 7 or 11, the bolt hole 33a is formed in the front end of the upper portion 36. The bolt hole 33a is formed to fix the actuator 50, and it is a hole into which the bolt 51 for stopping the rotation of the actuator 50 is inserted as described above. Additionally, in the main seat S, as illustrated in FIG. 7, in the upper portion 36, a portion which is located between the bolt hole 33a and the attachment area of the reclining mechanism 3 in the side wall 12 is welded to the side wall 12.

In other words, in the main seat S, the welding area X1 between the upper portion 36 and the side wall 12 exists between the bolt hole 33a and the penetration shaft 3b for driving the reclining mechanism 3. In this way, when the welding area X1 exists between the bolt hole 33a and the penetration shaft 3b, the positions of the bolt hole 33a and the penetration shaft 3b may not easily change. For this reason, the positional relation between the penetration the bolt 51 for fixing the actuator 50 and shaft 3b is stabilized. As a result, the actuator 50 is disposed stably at a position where the actuator may be continuously operated in a normal state.

As illustrated in FIGS. 4 and 6, the upper portion 36 and the lower portion 37 of the second extension portion 33 are respectively provided with the flanges which are bent inward in the width direction. Specifically, the upper portion 36 of the second extension portion 33 is provided with a second extension portion upper flange 38 of which the upper end is bent inward in the width direction. The second extension portion upper flange 38 corresponds to a bent portion, and it is formed from the front end of the upper portion 36 to the rear end thereof in order to reinforce the second extension portion 33.

As described above, since the reinforcement flange 38 is formed in the upper end of the upper portion 36 of the second extension portion 33, the rigidity of the lower member frame 31 is improved, and hence the rigidity of the side frame 11 to which the frame 31 is attached is also improved.

Furthermore, as illustrated in FIG. 4, the rear end of the second extension portion upper flange 38 is continuous to the first extension portion upper flange 34 which is formed in the upper end of the first extension portion 32. Accordingly, the rigidity of the entire lower member frame 31 is more improved.

Figure 12:
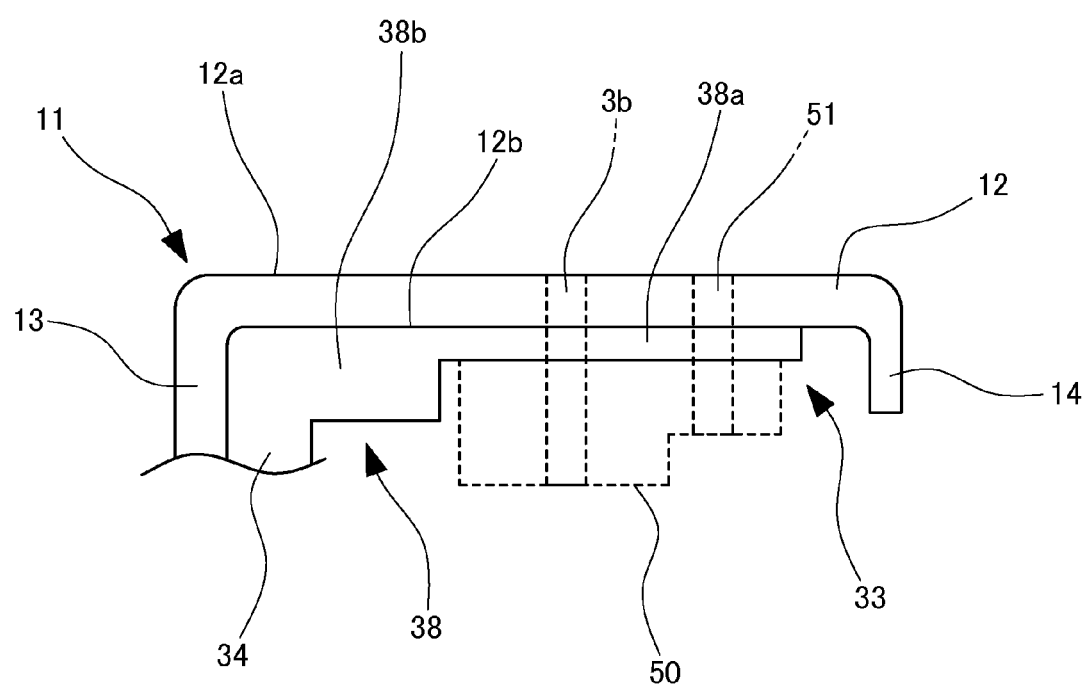
FIG. 12 is a top view illustrating the actuator and the periphery thereof.

Further, in order to avoid the interference between the second extension portion upper flange 38 and the actuator 50, the front end of the second extension portion upper flange 38 is notched as illustrated in FIG. 12. More specifically, in a portion (hereinafter, referred to as an adjacent portion 38a) which is adjacent to the bolt hole 33a of the upper portion 36 in the second extension portion upper flange 38, the inward extension amount in the width direction is shortened compared to a portion (hereinafter, referred to as a non-adjacent portion 38b) which is not adjacent to the portion provided with the bolt hole 33a. Since the adjacent portion 38a faces the vicinity of the attachment portion of the bolt 51 in the actuator 50, the second extension portion upper flange 38 may be formed while suppressing the interference with the actuator 50 by the above-described configuration.

As illustrated in FIGS. 4 and 6, the lower portion 37 of the second extension portion 33 is provided with a second extension portion lower flange 39 of which the lower end is bent inward in the width direction. The second extension portion lower flange 39 corresponds to a second extension portion side bent portion, and it is formed from the front end of the lower portion 37 to the rear end thereof in order to reinforce the second extension portion 33. Here, as described above, since the lower portion 37 extends in a circular-arc shape to wrap around from the rear side of the penetration shaft 3b to the front side thereof, the second extension portion lower flange 39 also extends in a circular-arc shape.

Additionally, in the main seat S, as illustrated in FIG. 6, the front end of the second extension portion lower flange 39 overlaps in the up and down direction the rear end extending in a circular-arc shape at the lower end position of the side wall 12 in the side wall side flange 14 formed in the side wall 12 of the side frame 11 while the second extension portion 33 is bonded to the side wall 12.

More specifically, the lower portion 37 of the second extension portion 33 extends so that the second extension portion lower flange 39 follows the side wall side flange 14 and the front end of the second extension portion lower flange 39 overlaps the rear end of the side wall side flange 14. That is, in the main seat S, the lower member frame 31 is attached to the side frame 11 so that the second extension portion lower flange 39 is provided continuously to the side wall side flange 14. Accordingly, the lower member frame 31 is strongly integrated with the side frame 11, particularly the lower end of the side wall 12, and hence the rigidity in the vicinity of the attachment portion of the lower member frame 31 in the side frame 11 is further improved.

Further, as illustrated in FIG. 4, the rear end of the second extension portion lower flange 39 is connected to the first extension portion lower flange 35 which is formed in the lower end of the first extension portion 32. Accordingly, the rigidity of the entire lower member frame 31 is further improved.

In the above-described embodiment, a configuration example of the seat frame for the vehicle seat according to various embodiments of the invention has been described. However, the above-described embodiment is merely an example for helping the comprehension, and it does not limit the invention. That is, the shapes, the dimensions, the arrangement, and the like of the above-described members may be modified and improved without departing from the spirit of the invention, and the equivalent thereof is included in the invention.

Figure 13:
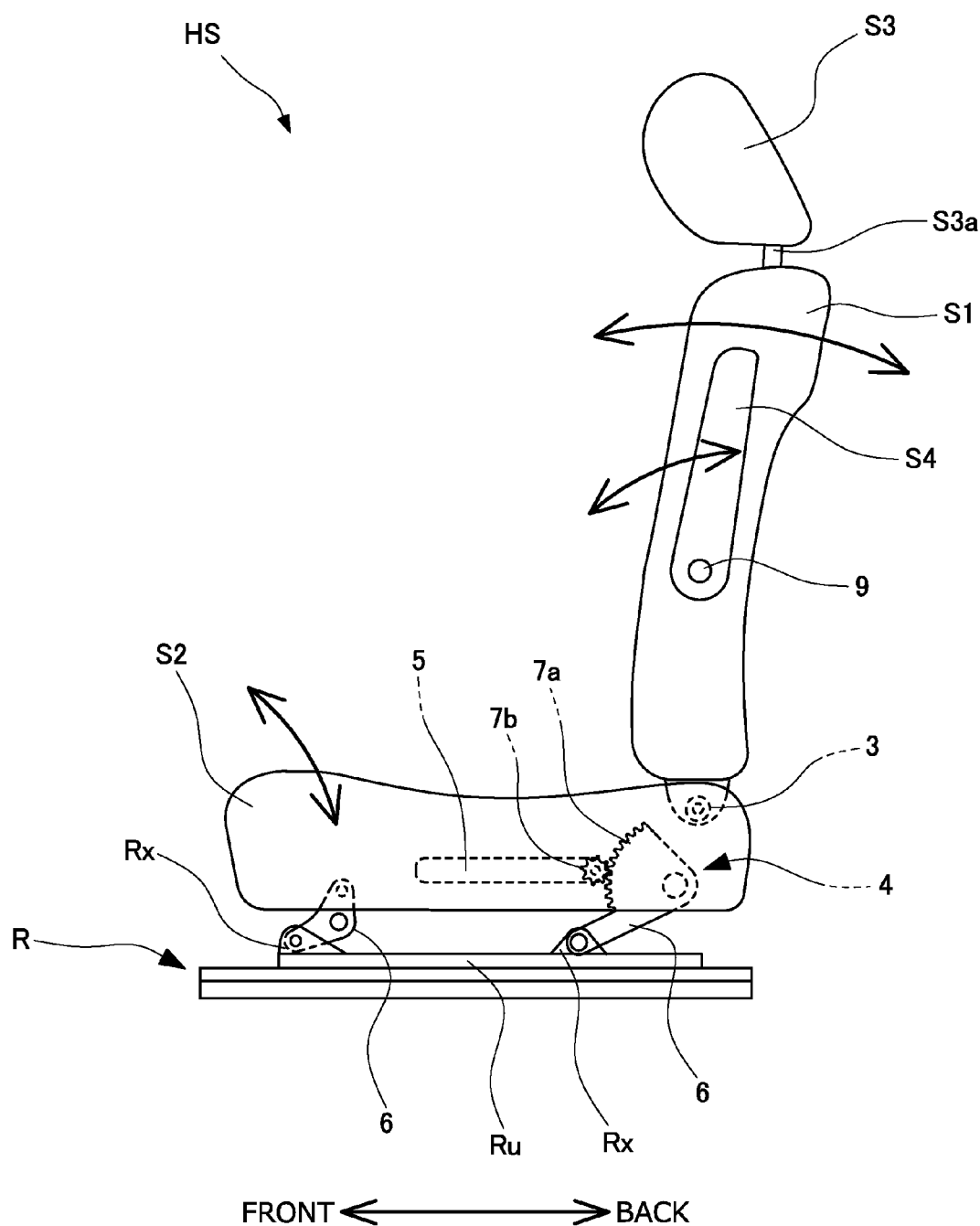
FIG. 13 is a schematic side view illustrating a modified example of the vehicle seat according to the embodiment of the invention.
Figure 14:
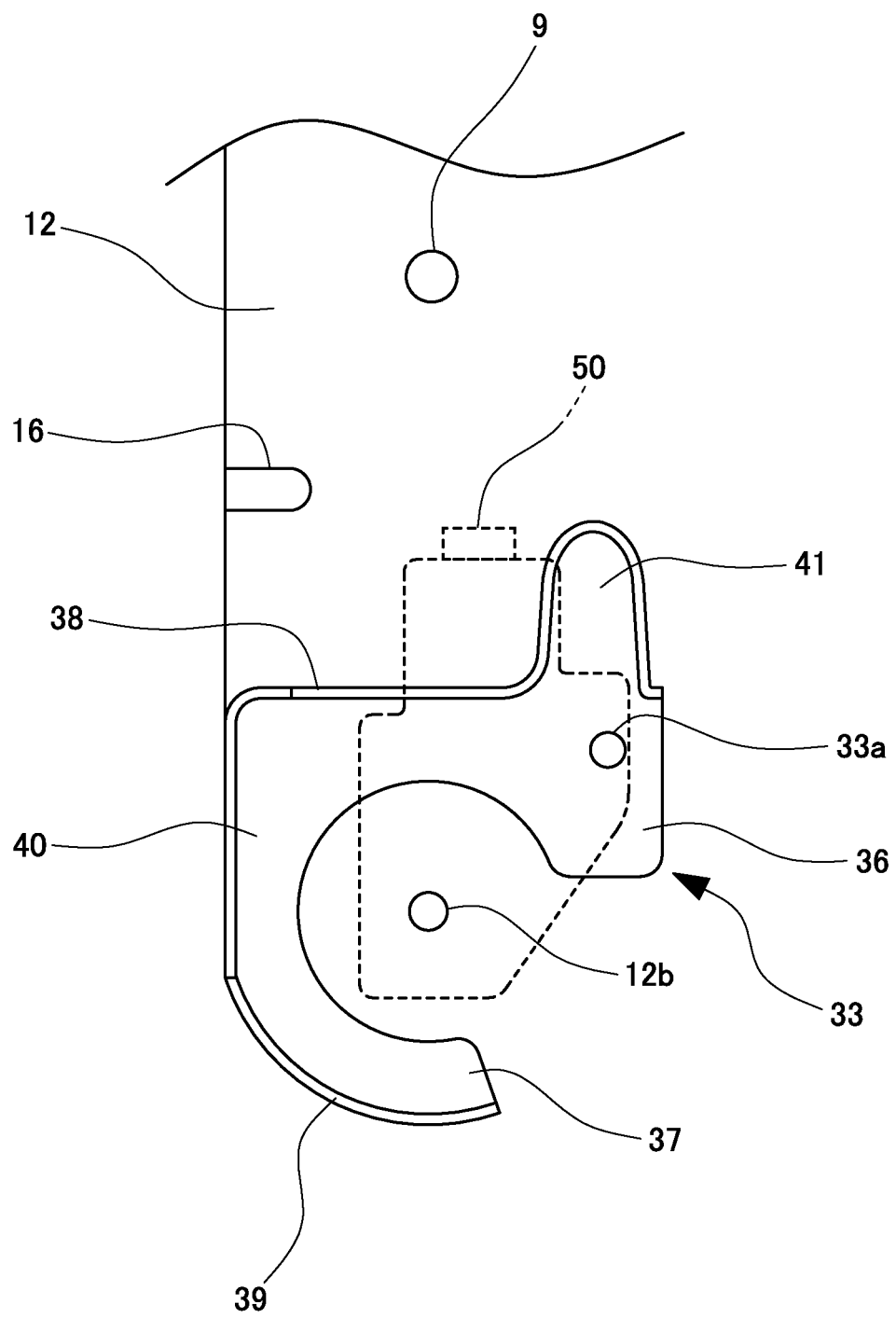
FIG. 14 is a side view illustrating a modified example of a positional relation among the side frame, the connection frame, and the actuator.

Hereinafter, a modified example of the seat frame of the vehicle seat of the invention will be described. The vehicle seat (hereinafter, referred to as a seat HS according to the modified example) according to the modified example includes an armrest S4 which is provided in one end of the seat back S1 in the width direction as illustrated in FIG. 13 in addition to the configuration like the vehicle seat according to the above-described embodiment. The armrest S4 is rotatable with respect to the seat back S1 in the up and down direction and the front to back direction, and an armrest rotation shaft 9 as a rotation shaft thereof is supported by the side wall 12 of the side frame 11 as illustrated in FIG. 14. More specifically, the armrest rotation shaft 9 is supported by a portion located above the attachment portion of the reclining mechanism 3 or the lower member frame 31 in the side wall 12.

When the armrest S4 rotates, that is, the armrest rotates in a direction to tilts forward, a load is applied to a portion which is located in front of the armrest rotation shaft 9 in the side frame 11. For this reason, it is desirable to improve the rigidity of the portion located in front of the armrest rotation shaft 9 in the side frame 11 compared to the other portion. For this reason, in the seat HS according to the modified example, the upper portion 36 of the second extension portion 33 of the lower member frame 31 is provided with an additional extension portion 41 which extends upward toward the armrest rotation shaft 9 as illustrated in FIG. 14.

The additional extension portion 41 corresponds to an extension portion, is located in front of the armrest rotation shaft 9, and it is bonded to the inner surface 12b of the side wall 12 of the side frame 11 by welding. Accordingly, the rigidity of the side frame 11, in particular, the rigidity of the portion located in front of the armrest rotation shaft 9 is improved with respect to the load generated by the rotation of the armrest S4.

Furthermore, in the seat HS according to the modified example, the additional extension portion 41 is provided directly above the portion provided with the bolt hole 33a in the upper portion 36. Accordingly, it is possible to improve the attachment rigidity for the actuator 50 in the second extension portion 33 of the lower member frame 31. Further, the upper end of the additional extension portion 41 does not reach the support position of the armrest rotation shaft 9 and is located slightly below the support position.

Further, as described above, the side wall 12 of the side frame 11 is provided with plural holes, but the additional extension portion 41 is bonded to the side frame 11 while avoiding the holes to not block these holes. Particularly, the rear end of the side wall 12 of the side frame 11 is provided with the elongated hole 16 which serves as a fragile portion deformed so that the side frame 11 is inclined backward when a collision load is applied from the rear side. Additionally, the additional extension portion 41 is provided at the front position of the elongated hole 16 as illustrated in FIG. 14. With such a positional relation, even when the additional extension portion 41 is provided, the additional extension portion does not influence the elongated hole 16, and hence the elongated hole 16 is satisfactorily deformed when the collision load is applied from the rear side.

The assembly described herein may be applied also to a case other than the above-described embodiment. For example, in the above-described embodiment, the second extension portion 33 of the lower member frame 31 are in contact with the inner surface 12b in the side wall 12 of the side frame 11. An area in which the reclining mechanism 3 is attached to the outer surface 12a in the side wall 12 is formed as the circular area M when viewed from the width direction. Additionally, an area in which the second extension portion 33 are in contact with the inner surface 12b in the side wall 12 is formed as the C-shaped area that follows the outer edge of the circular area M when viewed from the width direction. That is, the second extension portion 33 includes the upper portion 36 which is disposed above the circular area M and the lower portion 37 which is disposed below the circular area M. However, the invention is not limited thereto, and the second extension portion 33 may include only a portion corresponding to any one of the upper portion 36 and the lower portion 37.

Further, in the above-described embodiment, each of the upper portion 36 and the lower portion 37 is provided with the reinforcement flange (the second extension portion upper flange 38 and the second extension portion lower flange 39), but the invention is not limited thereto. For example, a configuration may be employed also in which the reinforcement flange is not provided.

Further, in the above-described embodiment, laser-welding is used as a method of boding the components of the main frame F, but the invention is not limited thereto. For example, the other welding methods (for example, TIG welding, MIG welding, and arc welding) may be used.

Further, in the above-described embodiment, the front ends of the upper portion 36 and the lower portion 37 are separated from each other and the rear ends thereof are connected to each other. However, the invention is not limited thereto, and a configuration may be employed in which the rear ends of the upper portion 36 and the lower portion 37 are separated from each other and the front ends thereof are connected to each other.

| TABLE OF REFERENCE NUMERALS | |
|---|---|
| S | main seat |
| S1 | seat back |
| S2 | seat cushion |
| S3 | headrest |
| S3a | pillar |
| S4 | armrest |
| F | main frame |
| F1 | seat back frame |
| F2 | seat cushion frame |
| fs | guide stay |
| R | slide rail mechanism |
| Ru | upper rail |
| Rx | support portion |
| M | circular area |
| X1, X2 | welding area |
| HS | seat according to modified example |
| 1 | side frame |
| 3 | reclining mechanism |
| 3a | reclining mechanism body |
| 3b | penetration shaft |
| 3c | penetration shaft portion |
| 4 | height adjustment mechanism |
| 5 | operation lever |
| 6 | rotary link |
| 7a | sector gear |
| 7b | pinion gear |
| 9 | armrest rotation shaft |
| 11 | side frame |
| 12 | side wall |
| 12a | outer surface |
| 12b | inner surface |
| 12c | hole |
| 12d | bolt hole |
| 13 | rear wall |
| 13a | member frame attachment portion |
| 14 | side wall side flange |
| 15 | rear wall side flange |
| 16 | elongated hole |
| 21 | upper frame |
| 22 | bent portion |
| 23 | upper member frame |
| 23a | opening |
| 31 | lower member frame |
| 32 | first extension portion |
| 32a | bulged portion |
| 32b | hole |
| 33 | second extension portion |
| 33a | bolt hole |
| 34 | first extension portion upper flange |
| 35 | first extension portion lower flange |
| 36 | upper portion |
| 37 | lower portion |
| 38 | second extension portion upper flange |
| 38a | adjacent portion |
| 38b | non-adjacent portion |
| 39 | second extension portion lower flange |
| 40 | connection portion |
| 41 | additional extension portion |
| 50 | actuator |
| 51 | bolt |

The invention claimed is:

1. A seat frame for a vehicle seat comprising:
a side frame which is disposed at each end of a seat back frame of a seat back of the vehicle seat in a width direction of the vehicle seat;
a reclining mechanism which comprises a rotation shaft extending in the width direction and pivots the seat back with respect to a seat cushion of the vehicle seat by the rotation of the rotation shaft; and
an actuator which is driven to rotate the rotation shaft, wherein:
the reclining mechanism is attached to a side wall of the side frame while the rotation shaft penetrates the side wall of the side frame,
the actuator is fixed to an attachment bracket bonded to an inner surface of the side wall in the width direction while engaging with a portion of the rotation shaft penetrating the side wall of the side frame,
the attachment bracket comprises:
an upper portion which is disposed above an attachment area of the reclining mechanism in the side wall; and
a lower portion which is disposed below the attachment area of the reclining mechanism in the side wall, and
one end of the upper portion and one end of the lower portion in a front to back direction of the vehicle seat are connected to each other, and
an other end of the upper portion and an other end of the lower portion in the front to back direction are separated from each other.

2. The seat frame for the vehicle seat according to claim 1, further comprising:
a connection frame which connects the lower ends of the side frames to each other,
wherein the attachment bracket is disposed at each of both ends of the connection frame and is integrated with the connection frame.

3. The seat frame for the vehicle seat according to claim 1, wherein:
the upper portion is provided with a bolt hole for fixing the actuator, and
a portion, which is located between the bolt hole and the attachment area of the reclining mechanism in the side wall, in the upper portion, is welded to the side wall.

4. The seat frame for the vehicle seat according to claim 1, wherein:
a portion in which the reclining mechanism is attached to the side wall is formed as a circular area when viewed from the width direction, and
the attachment bracket is formed in a C-shape that follows the outer edge of the attachment area of the reclining mechanism in the side wall when viewed from the width direction.

5. The seat frame for the vehicle seat according to claim 4, wherein:
the upper portion and the lower portion are respectively welded to the side wall,
at least a portion of the welding area between the upper portion and the side wall is located in front of the rotation shaft, and
at least a portion of the welding area between the lower portion and the side wall is located behind the rotation shaft.

6. The seat frame for the vehicle seat according to claim 1, wherein the upper end of the attachment bracket is provided with a bent portion which is bent inward in the width direction.

7. The seat frame for the vehicle seat according to claim 6, wherein:
the upper portion is provided with a bolt hole for fixing the actuator, and
a portion, which is adjacent to the portion provided with the bolt hole in the attachment bracket, in the bent portion, has an inward extension amount in the width direction shorter than the portion which is not adjacent to the portion provided with the bolt hole.

8. The seat frame for the vehicle seat according to claim 1, wherein:
a portion, which is located above the attachment bracket, in the side wall supports an armrest rotation shaft used when an armrest of the vehicle seat rotates with respect to the seat back,
the upper portion comprises an extension portion which extends upward toward the armrest rotation shaft, and
the extension portion is provided in front of the armrest rotation shaft.

9. The seat frame for the vehicle seat according to claim 8, wherein:
the rear end of the side wall is provided with a fragile portion which is deformed so that the side frame is inclined backward when a collision load is applied from the rear side, and
the extension portion is provided in front of the fragile portion.

* * * * *